United States Patent [19]
Kitamoto et al.

[11] 3,819,411
[45] June 25, 1974

[54] FERROMAGNETIC CHROMIUM DIOXIDE COMPOSITION AND MAGNETIC RECORDING MEDIUM CONTAINING SAME

[75] Inventors: Tatsuji Kitamoto; Yasuyuki Yamada, both of Odawara, Japan

[73] Assignee: Fuji Photo Film Co., Ltd., Kanawaga, Japan

[22] Filed: Dec. 15, 1971

[21] Appl. No.: 208,433

[30] Foreign Application Priority Data

Dec. 16, 1970 Japan .............................. 45-111732

[52] U.S. Cl. ............... 117/235, 252/62.51, 423/607
[51] Int. Cl. ............................................ C01g 37/02
[58] Field of Search .................. 252/62.51; 423/607; 117/235

[56] References Cited

UNITED STATES PATENTS

| | | | |
|---|---|---|---|
| 3,371,043 | 2/1968 | Hund et al. | 252/62.51 |
| 3,449,073 | 6/1969 | Balthis | 252/62.51 X |
| 3,512,930 | 5/1970 | Botler et al. | 252/62.51 X |
| 3,585,141 | 6/1971 | Ingersoll | 252/62.51 X |
| 3,586,630 | 6/1971 | Ingersoll | 252/62.51 X |
| 3,686,031 | 8/1972 | Balthis | 252/62.51 X |

*Primary Examiner*—Jack Cooper
*Attorney, Agent, or Firm*—Sughrue, Rothwell, Mion, Zinn & Macpeak

[57] ABSTRACT

A ferromagnetic chromium dioxide composition for use as a magnetic material of a magnetic recording medium is produced from a mixture of the powders of ferromagnetic chromium dioxide or its derivative with a compound of an ion capable of forming a water-insoluble compound upon reaction with a hexavalent chromium ion, such as barium stearate or zinc oxide.

7 Claims, No Drawings

FERROMAGNETIC CHROMIUM DIOXIDE COMPOSITION AND MAGNETIC RECORDING MEDIUM CONTAINING SAME

BACKGROUND OF THE INVENTION 1. Field of the Invention

This invention relates to improvements in ferromagnetic chromium dioxide composition and its derivatives, chromium dioxide which is added with Sb, Sn, Te and Fe at the preparation, and more particularly, to improvements in ferromagnetic chromium dioxide or its derivative suitable for use as a magnetic material of a magnetic recording medium.

2. Description of the Prior Art

The conventional magnetic recording medium comprising chromium dioxide or a chromium dioxide derivative containing antimony, tellurium, tin, iron, cobalt or other element or ion (these two will inclusively be called ferromagnetic chromium dioxide hereinafter) poses a problem of deterioration of the binder or support caused by a strongly oxidizing substance such as unreacted chromic acid ions present in chromium dioxide. The ferromagnetic chromium dioxide is a rutile-type ferromagnetic body obtained by the reaction of a hexavalent chromium compound or trivalent chromium compound at high temperatures and pressures.

In this reaction, unreacted matter inevitably occurs. The unreacted matter such as chromic acid ions has a strong oxidizing action, and causes deterioration of an organic polymer used as the binder, such as cellulose derivatives, vinyl chloride/vinyl acetate copolymers, vinyl acetate resins, acrylic acid resins, epoxy resins, and polyurethane resins. It is also observed that when an acetate film is used as the support, the unreacted matter also adversely affects the strength of the support with the passage of time. In order to avoid such phenomena, it has been the conventional practice to wash the resultant chromium dioxide in powder form as much as possible with water to dissolve, and carry away, the chromium ions. However, complete removal by washing with water has been quite timeconsuming, and difficult even when the chromium ions have been completely washed away with water, $CrO_2$ is partly decomposed into $Cr_2O_3$ and $CrO_3$ during the storage of the magnetic tape under high temperature and humid conditions, and the resultant hexavalent chromium ions exert a similar action.

SUMMARY OF THE INVENTION

It is an object of this invention to provide a ferromagnetic powder composition consisting predominantly of ferromagnetic chromium dioxide, which is free from the aforementioned defects.

According to this invention, there is provided a ferromagnetic chromium dioxide composition comprising a mixture of ferromagnetic chromium dioxide powders with a compound of an ion capable of forming a water-insoluble compound upon reaction with a hexavalent chromium ion.

The unreacted matter such as chromic acid ions and dichromic acids which are present in chromium dioxide or which are decomposed with moisture in the air have a so strong oxidizing action that they oxidize the organic binder of the magnetic tape and deteriorates the strength, flexibility and adhesiveness. In order to avoid the above phenomena, the present invention provides a method of preventing the deterioration of the organic binder by converting hexavalent chrome to the insoluble chromic acid salt and dichromic chrome to the insoluble chromic acid salt and dichromic acid salt prior to the reaction of hexavalent chromium with the organic binder.

The reason why it is mandatory that a compound of an ion be water insoluble is:

Chromic acid and dichromic acid ions are strongly polar and when the magnetic layer adsorbs the moisture in the air, they melt in the moisture to oxidize the organic compounds thereabout. This phenomena takes place also when the polar solvent is present. In this point, water-insoluble chromic acid salt and dichromic acid salt are not liquid and the reaction area is not so extended that the oxidation reaction is severely prevented.

DETAILED DESCRIPTION OF THE INVENTION

The ferromagnetic chromium dioxide as one component of the composition of the invention is a ferromagnetic body having a rutile-type crystal structure which is obtained by the decomposition of a hexavalent chromium compound at high temperatures and pressures or by the oxidation of a divalent or trivalent chromium compound at high temperatures and pressures. At atmospheric pressure, chromium dioxide cannot exist as a thermodynamically stable phase, and therefore, its production is generally performed at a high pressure above about 50 atmospheres and at a temperature of 300° to 600° C (see U.S. Pat. Nos. 2,956,955, 2,923,683, 3,034,988, 3,371,043, 3,243,260). Antimony, tellurium, tin, iron, cobalt, and other elements or ions may be added effectively at this time in order to improve the magnetic characteristics, especially the coercive force, of chromium dioxide. It is known that by such a method there can be obtained chromium dioxide having a coercive force of 250 to 600 oersteds which is suitable for magnetic recording. This is what is called the chromium dioxide derivative in the present invention. The chromium dioxide is usually obtained in the form of a solid mass consisting of an aggregate of needlelike finely divided particles having a length of not more than $10\mu$. It contains a strongly oxidizing substance such as unreacted chromic acid ions, which cannot be completely removed even by washing with water. Furthermore, chromium dioxide itself tends to be decomposed at high temperatures and humidities to form a hexavalent soluble chromium salt.

Examples of the compound that is capable of forming a water-insoluble compound by reaction with a hexavalent chromium ion include: lead compounds such as lead powder, PbO, $Pb_3O_3$, basic lead hydroxide, lead naphthenate, lead stearate, and $PbCO_3$; barium compounds such as $BaCO_3$, barium oxalate, and barium stearate; zinc compounds such as zinc powder, ZnO, $ZnCO_3$, zinc stearate, zinc naphthenate, and zinc lactate; and cadmium compounds such as cadmium stearate and cadmium sulfide. The substance which is to react with chromic acid and dichromic acid other than the binder must be a solid which is hardly water-soluble, otherwise, exudation on the surface of the magnetic layer deleteriously takes place. Lead and zinc powders are operable. Most of halide, nitrate, sulfate and the like are water-soluble. Sulfide is not claimed since it might form $SO_3^-$, and $SO_4^-$upon reaction with chromic acid.

Accordingly, the substance applicable to the present invention is water-insoluble (insoluble to the polar solvent) desirably such as elements, oxides, hydroxides, carbonates and organic compounds (carboxylates) which react with chromic acid or dichromic acid so as not to present the water-soluble compound other than water-insoluble chromic acid salt or dichromic acid salt.

The metallic "ions" are selected on the parameter that they form water-insoluble salts when reacted with chromic acid and dichromic acid. Therefore, such selection cannot be dependent upon Periodic Table and electronegativity. For example, the solubility of the chromic acid salt in IIa group is: Mg 72, Ca 2.3, Sr 0.12, Ba $3 \times 10^{-4}$ ($g/100gH_2O$) so only Ba is useful.

The process of generating chromic acid and dichromic acid ions from the hexavalent chromium which is present in chromium dioxide as impurities and the movement thereof when hexavalent chromium is considered to move with water at diffusion are not clear. It is considered that hexavalent chromium becomes ionic with water and diffuses into the magnetic layer.

The reaction is considered to take place at a solid-liquid phase during the diffusion. A certain range of pH may be defined. Oxalate is operable. The lower monocarbonates, formate and acetates are not operable because of water solubility. The salts of higher fatty acid are all operable.

The amount of said compound to be added to the ferromagnetic chromium dioxide is 0.7 to 1.5 molar equivalents, preferred range, based on the soluble chromium ions expected. With this amount, a marked effect is produced. The upper limit may be 20 molar equivalents at which the sensitivity of the magnetic tape is degraded to 2db.

Such an additive compound is in an intimately mixed condition with chromium dioxide, and reacts with a hexavalent chromium salt remaining in the chromium dioxide powder and a hexavalent chromium salt resulting from the decomposition of chromium dioxide before the hexavalent chromium salts badly corrode the organic binder, the support layer, or the like, and converts them to water-insoluble, chemically inert chromates, bichromates, etc. This also has an effect of preventing the formation of $CrO_3$ by the presence of moisture, etc. during storage, and the autocatalytic decomposition of $CrO_2$.

The powdery composition is a mixture of the powders of such an additive with the powders of ferromagnetic chromium dioxide.

The invention will be specifically described by the following Examples.

| Example | parts by weight |
|---|---|
| $CrO_2$ (containing 1.5% by weight calculated as chromium trioxide | 300 tioxide soluble chromium ions) |
| Barium stearate (additive) | 30 |
| Cellulose acetate butyrate (main binder) | 90 |
| Silicone oil | 0.5 |
| Plasticizer | 8 |
| Solvent (1:1 mixture of methyl ethyl ketone and toluene) | 450 |

A composition of the foregoing formulation was thoroughly treated in a ball mill. The resultant coating solution was applied to a primer-coated 25μ thick polyethylene terephthalate film in a dry thickness of 6μ by doctor blades. The resultant specimen was designated as 1—1.

Various specimens were prepared by the method mentioned above except that the amounts of soluble chromium ions contained in $CrO_2$ and the kinds of the main binder and the additive were changed as indicated in Table 1.

Table 1

| Specimen | Additive | Weight (g) | Kind of main binder | Amount * of soluble Cr ions in the magnetic material (%) |
|---|---|---|---|---|
| 1—1 | Barium stearate | (30) | Cellulose acetate butyrate | |
| 1—2 | | 10 | | 1.5 |
| 1—3 | | 0 | | |
| 2—1 | | (35) | Copolymer of vinyl chloride and vinyl acetate | |
| 2—2 | do. | 28 | | 1.5 |
| 2—3 | | 0 | | |
| 3—1 | Lead stearate | 20 | Cellulose propionate | 0.8 |
| 3—2 | | (16) | | |
| 3—3 | | 0 | Cellulose propionate | |
| 4—1 | Barium carbonate | 3.0 | Styrene/butadiene copolymer | |
| 4—2 | | (1.5) | | 0.3 |
| 4—3 | | 0 | | |
| 5—1 | Cadmium stearate | 15 | Cellulose acetate butyrate | |
| 5—2 | | (9) | | 0.5 |
| 5—3 | | 0 | | |
| 6—1 | | 3 | | |
| 6—2 | Zinc oxide | (2) | Thermoplastic polyurethane resin | 1.0 |
| 6—3 | | 0 | | |

Note
1) * Weight percent calculated as chromium trioxide.
2) The amounts in the parentheses indicate that the additives were used in an amount almost equivalent to that of chromic anhydride.

An adhesive tape was attached to each of the 18 specimens obtained, and the specimens were allowed to stand for 200 hours in a high temperature - high humidity atmosphere. In specimens 1–3, 2–3, 3–3, 4–3, 5–3, and 6–3 which did not contain the additive specified in the invention, the yellow chromium compound moved to the adhesive tape. When an adhesive tape was freshly attached to the magnetic layer and then abruptly stripped off, the magnetic recording layer was broken, and 70 to 100 percent of it was transferred to the adhesive tape.

On the other hand, the yellow chromium compound was not moved in other specimens, or moved only in small amounts. A scratch test was conducted using a diamond needle to determine the ease of injury. Where an injury was easier to cause, the deterioration of the binder went further. The results are shown in Table 2 below. It is seen from these results that in the peel off test too, the breakage of the magnetic recording layer did not occur in the specimens containing the additives, and there was a lesser amount of the magnetic recording layer that was transferred to the adhesive tape. In other words, by using the composition of the present invention, the deterioration of the binder of the magnetic recording layer can be prevented to a great extent.

Table 2

| Specimen | Extent of yellowing* | Peel off test**(%) | Scratch test*** |
|---|---|---|---|
| 1—1 | 1 | 20 | 2 |
| 1—2 | 2 | 20 | 2 |
| 1—3 | 3 | 80 | 3 |
| 2—1 | 1 | 30 | 1 |
| 2—2 | 1 | 40 | 1 |
| 2—3 | 3 | 100 | 3 |
| 3—1 | 1 | 20 | 2 |
| 3—2 | 2 | 20 | 1 |
| 3—3 | 3 | 70 | 3 (film partly stripped off) |
| 4—1 | 2 | 10 | 1 |
| 4—2 | 2 | 10 | 2 |
| 4—3 | 3 | 100 | 3 |
| 5—1 | 2 | 5 | 2 |
| 5—2 | 2 | 10 | 1 |
| 5—3 | 3 | 90 | 3 |
| 6—1 | 1 | 5 | 1 |
| 6—3 | 1 | 20 | 1 |
| 6—3 | 3 | 90 | 3 (film partly stripped off) |

* 1. no yellowing
2. some yellowing
3. strong yellowing

** The area of the magnetic recording layer transferred to an adhesive tape when the adhesive layer was attached to the specimen and stripped off.

*** A load of 15 g was exerted on a diamond needle, and the specimen was scratched with the diamond needle. The degree of the scratch was observed by a microscope. The scratch was larger with increasing numerical figures.

1. the width of the scratched groove was 30 to 40μ.
2. the width was 50 to 70μ.
3. the width was more than 70μ.

What is claimed is:

1. In a ferromagnetic chromium dioxide composition consisting essentially of a chromium dioxide ferromagnetic powder wherein the composition contains free hexavalent chromium ions, the improvement comprising said composition consisting essentially of, in addition to said chromium dioxide ferromagnetic powder, an amount of a member selected from the group consisting of lead powders, PbO, $Pb_3O_3$, basic lead hydroxide, lead naphthenate, lead stearate, $PbCO_3$, $BaCO_3$, barium oxalate, barium stearate, zinc powders, ZnO, $ZnCO_3$, zinc stearate, zinc naphthenate, zinc lactate, cadmium stearate and cadmium sulfide, said member being capable of forming a water-insoluble metallic chromic acid salt or a water-insoluble metallic dichromic acid salt by reaction with all of the free hexavalent chromium ions present in said composition, the resulting composition being substantially free of said hexavalent chromium ions, said amount being from 0.7 to 1.5 molar equivalents of said member based on the moles of free hexavalent chromium ions remaining in the composition.

2. A composition according to claim 1, wherein antimony, tellurium, tin, iron, or cobalt is contained therein in an amount sufficient to improve the magnetic characteristics of the ferromagnetic chromium dioxide.

3. A composition according to claim 2 wherein the coercive force of said ferromagnetic chromium dioxide powder is from 250 to 600 oersteds.

4. A magnetic recording member comprising a support having coated thereon the composition of claim 1 dispersed in a binder therefor.

5. A composition according to claim 1 wherein the amount of said free hexavalent chromium ions remaining in said composition is from 0.3 to 1.5 percent by weight, based on the weight of said composition.

6. A composition according to claim 1 wherein said ferromagnetic chromium dioxide powder is in the form of a solid mass consisting of an aggregate of needle-like finely-divided particles having a length of not more than 10 microns.

7. A composition according to claim 1 wherein said member is a solid and is substantially water-insoluble.

* * * * *

UNITED STATES PATENT OFFICE

CERTIFICATE OF CORRECTION

Patent No. 3,819,411 Dated June 25, 1974

Inventor(s) Tatsuji Kitamoto et al

It is certified that error appears in the above-identified patent and that said Letters Patent are hereby corrected as shown below:

In The Specification:

Column 2, line 54 "$Pb_3O_3$" should be -- $Pb_3O_4$ --

Column 5, line 66 "$Pb_3O_3$" should be -- $Pb_3O_4$ --

Signed and sealed this 19th day of November 1974.

(SEAL)
Attest:

McCOY M. GIBSON JR.
Attesting Officer

C. MARSHALL DANN
Commissioner of Patents